Figures 1, 2:
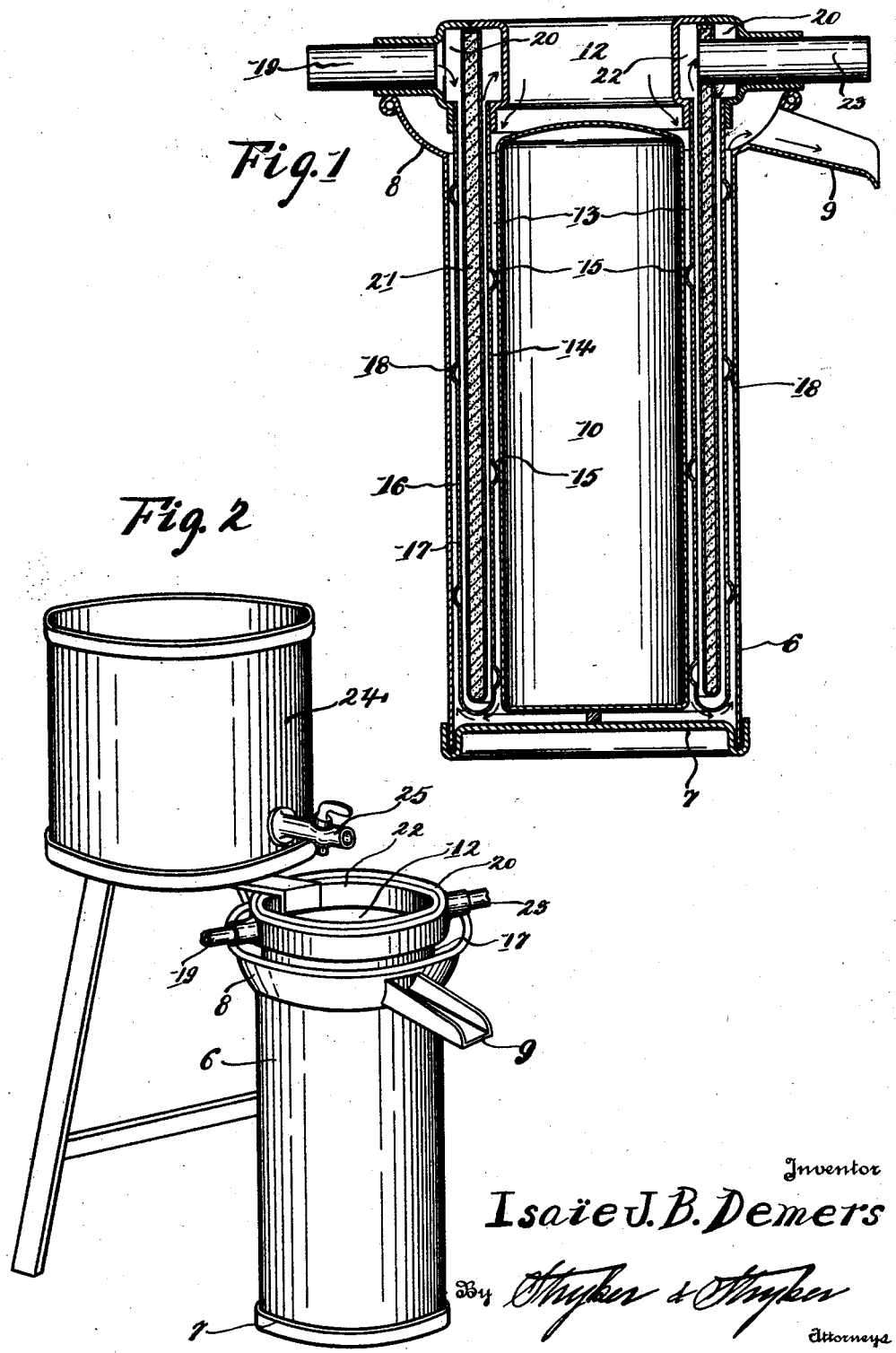

Oct. 13, 1931.   I. J. B. DEMERS   1,826,750
MILK COOLER
Filed Oct. 6, 1930    2 Sheets-Sheet 1

Inventor
Isaïe J. B. Demers
By Stryker & Stryker
Attorneys

Oct. 13, 1931.  I. J. B. DEMERS  1,826,750
MILK COOLER
Filed Oct. 6, 1930  2 Sheets-Sheet 2
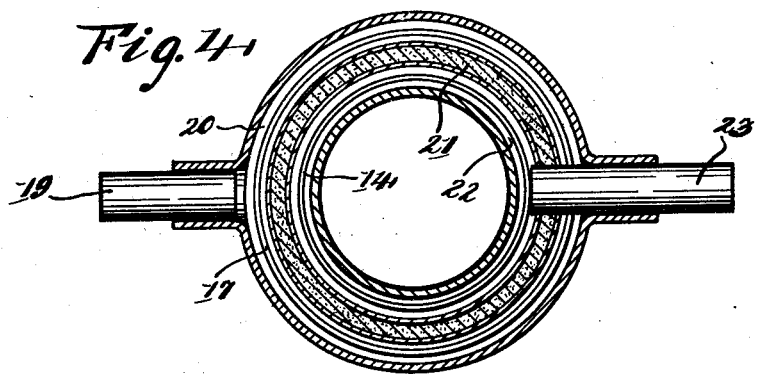
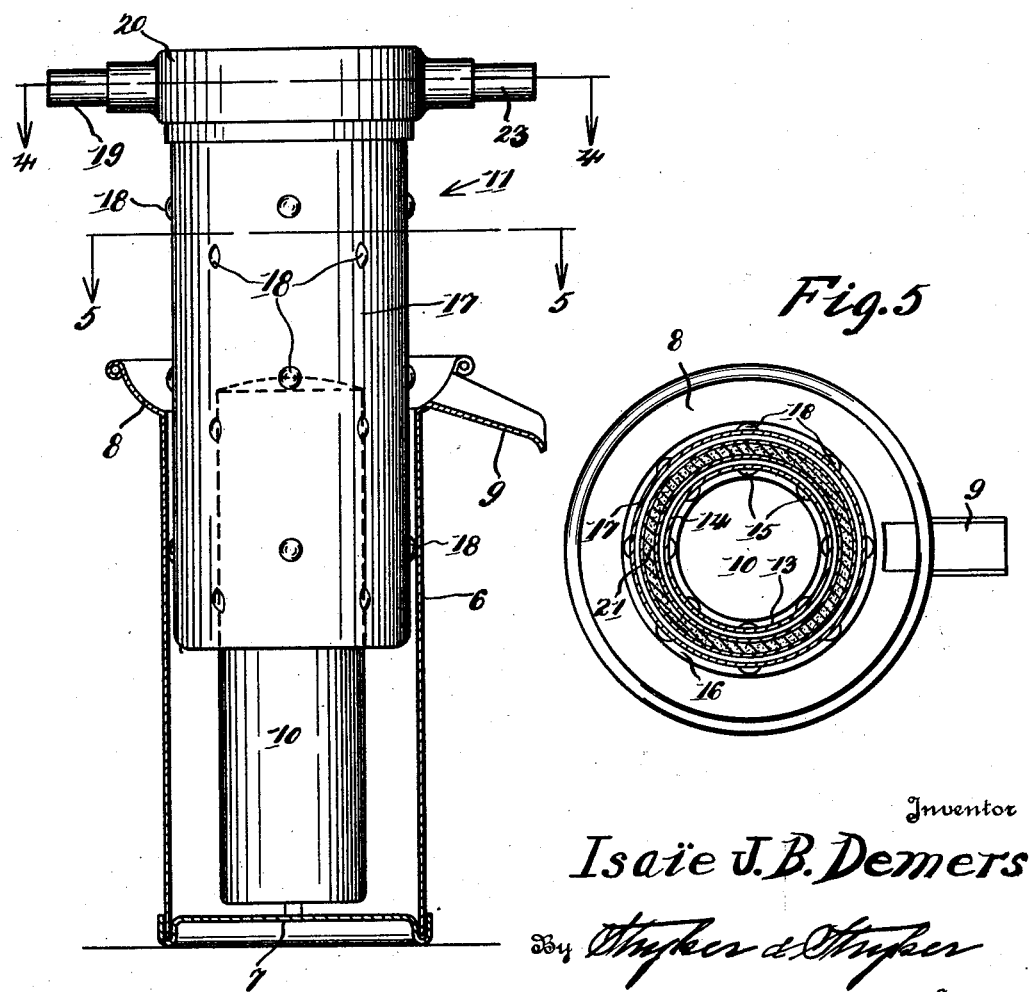
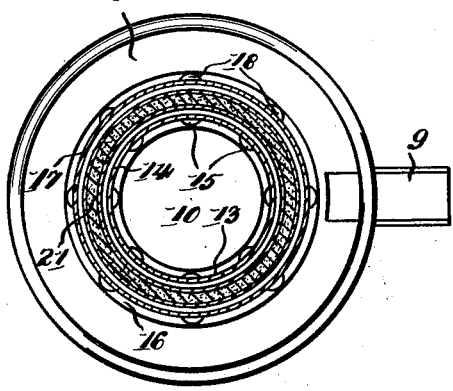
Inventor
Isaïe J. B. Demers
By Stryker & Stryker
Attorneys Patented Oct. 13, 1931

1,826,750

UNITED STATES PATENT OFFICE

ISAÏE J. B. DEMERS, OF ST. PAUL, MINNESOTA, ASSIGNOR TO SUPERIOR METAL PRODUCTS COMPANY, OF ST. PAUL, MINNESOTA, A CORPORATION OF DELAWARE

MILK COOLER

Application filed October 6, 1930. Serial No. 486,591.

It is my object to provide a cooler for milk of unusually simple and durable construction adapted to withstand the rough usage to which the device is subjected in dairies, and to facilitate cleaning and sterilization of the component parts.

A further object is to promote uniformly rapid absorption of heat by a novel arrangement of passages for the cooling fluid and for the milk or other fluid to be cooled. Another object is to facilitate control of temperature and rate of heat transfer in the device to thereby permit compensation for cooling fluids of different temperatures. The invention also includes certain other novel features of construction which will be more fully pointed out in the following specification and claims.

In the drawings, Figure 1 is a central vertical section through my improved cooler; Fig. 2 is a perspective view showing the same in connection with a suitably controlled milk supply; Fig. 3 is a central vertical section through the outer casing and showing the cooling element partially withdrawn; Fig. 4 is a horizontal section taken on the line 4—4 of Fig. 3 and Fig. 5 is a horizontal section taken on the line 5—5 of Fig. 3.

The cooler has a cylindrical, outer casing 6, closed at its bottom 7 and open at its top. Around the upper edge of the casing 6 is a flaring bowl 8 and an outlet spout 9 for the milk or other fluid to be cooled communicates with the bowl 8. An inner casing 10 is removably mounted within the casing 6 in spaced relation thereto and has a cylindrical drum shape, being closed at its upper and lower ends.

In the annular space between the outer and inner casings, a cylindrical cooling element 11 removably fits. This cooling element has an upper end portion forming a central reservoir 12, above the casing 10, for a supply of the fluid to be cooled. The reservoir communicates with an annular passage 13 between the inner casing 10 and an inner wall 14 of the cooling element 11. A multiplicity of small projections 15 are formed on the wall 14 to engage the casing 10 and maintain the proper uniform spacing of the adjacent elements. I thus insure that the passage 13 for fluid is a very thin or attenuated one of uniform thickness. At its lower end the passage 13 communicates with a concentric, annular passage 16 between the outer casing 6 and an outer wall 17 of the cooling element 11. This wall 17 has small projections 18 similar to the projections 15 for maintaining the wall 17 in proper spaced relation to the casing 6. The upper end of the passage 16 communicates with the bowl 8 so that milk readily flows from the central reservoir downward through the passage 13, then upward through the passage 16 to the bowl 8 and thence out through the spout 9.

A suitable cooling fluid is admittted to the element 11 through an inlet pipe 19 which communicates with an annular conduit 20 in the head 12. The conduit 20 distributes cooling fluid to an attenuated annular space between the wall 17 of the cooling element and an annular baffle 21 extending between the inner and outer walls of said cooling element. The baffle 21 consists of a body of insulating material having a suitable covering of sheet metal secured in spaced relation to the inner and outer walls. The space between the wall 17 and baffle connects at its lower end with a similar space between the baffle and inner wall 14 of the cooling element. By this arrangement the cooling fluid is caused to pass downward adjacent to the outer wall of the cooling element and upward adjacent to the inner wall thereof, the baffle being arranged to separate the annular conduit 20 from a similar conduit 22 communicating with the space between the baffle 21 and wall 14. An outlet pipe 23 for the cooling fluid communicates with the conduit 22. The openings through the pipes 19 and 23 are preferably somewhat larger, in cross sectional area, than the area of the space between the baffle and outer or inner walls of the cooling element so that the cooling fluid is uniformly distributed around the baffle.

A supply tank 24 for the milk or other fluid to be cooled is provided with an outlet spigot 25 to deliver the fluid to the central reservoir 12 in the cooler.

In use, the pipes 19 and 23 may be connected to suitable supply and waste pipes or hose, and cooling fluid is supplied under pressure to the pipe 19. The fluid to be cooled is placed in the tank 24 and by regulating the opening in the spigot 25 the rate of flow is adjusted to give the desired cooling. If a very cold water or other cooling fluid is available for passage through the cooling element, the milk may be passed rapidly through the cooler. To increase the flow of milk, the spigot 25 is opened sufficiently to produce a substantial head in the reservoir 12 and relatively rapid flow is established through the annular passages 13 and 16. On the other hand, if relatively warm cooling fluid is supplied, the rate of flow of the milk may be reduced to any desired degree with a resulting slow passage in contact with the cooling surfaces. It will be evident that the direction of flow of the cooling fluid is opposite to that of the fluid to be cooled in the adjacent passages and that the downward flowing column of cooling fluid is not warmed by the up-flowing column because of my arrangement of the baffle 21 containing the body of insulating material.

By my arrangement of all inlet and outlet connections communicating with the upper portion of the apparatus, I greatly simplify the contruction and at the same time make the several surfaces which contact with the milk readily accessible for thorough cleansing. Thus when the device is to be cleaned and sterilized the cooling element 11 may be quickly withdrawn from the outer casing 6 and the inner casing 10 may also be removed. All surfaces requiring attention are now readily accessible.

Simplicity and ease of handling is promoted by making the several parts of the cooling element permanently secured together and sealed. The cooling element, with its connections and distributing conduits, is a rigid, unitary structure of rugged, durable construction. By employing the small projections 15 and 18, I insure the maintenance of uniform spacing and at the same time the passages for liquid are made unusually thin. It has been found that these thin passages, combined with a considerable head of liquid, promote rapid cooling or transfer of heat by causing rapid and uniform flow throughout the passages.

Having described my invention what I claim as new and desire to protect by Letters Patent is:

1. A cooler for fluids comprising, outer and inner casings spaced apart, a unitary cooling element located between said outer and inner casing members, means for maintaining said cooling element in spaced relation to said inner and outer casing members, means for providing attenuated spaces for fluid to be cooled, an inlet for supplying fluid to be cooled communicating with the space between said cooling element and inner casing, an outlet for said fluid communicating with said outer casing near its upper end, and means for circulating cooling fluid in said cooling element.

2. A cooler for fluids comprising, outer and inner casings spaced apart, a unitary, cylindrical cooling element located between said outer and inner casing members, means for maintaining said cooling element in spaced relation to said inner and outer casing members, means for supplying fluid to be cooled to the space between said cooling element and inner casing, an outlet for said fluid communicating with said outer casing near its upper end, and inlet and outlet pipes for cooling fluid communicating with said cooling element above said outer casing.

3. A milk cooler comprising, outer and inner casings spaced apart, a unitary cooling element having outer and inner walls located betwen said outer and inner casing members, means for maintaining said cooling element in spaced relation to said inner and outer casing members to provide attenuated milk passageways, communicating with each other at their lower ends, means for supplying milk to the passageways between said cooling element and inner casing, an outlet for milk communicating with said outer casing near its upper end, an annular baffle extending within said cooling unit between its outer and inner walls, an inlet for cooling fluid communicating with the outer surface of said baffle and an outlet for cooling fluid communicating with the inner surface of said baffle, said baffle being arranged to direct cooling fluid downward adjacent to the outer wall of the cooling unit and upward adjacent to the inner wall thereof.

4. A cooler comprising, outer and inner casing members having an annular space between them, an annular cooling element located between said casing members in spaced relation thereto and projecting above the same, a reservoir for fluid to be cooled formed in said cooling element above said inner casing member, an outlet communicating with the upper portion of said outer casing and means for circulating cooling fluid in said cooling element.

5. In a milk cooler, outer and inner cylindrical casing spaced apart, a cylindrical cooling element located in the space between said inner and outer casing members, means for maintaining said cooling element in spaced relation to said inner and outer casing members to form annular passages for milk to be cooled, a head on said inner casing member forming, with said cooling member, a reservoir for milk to be cooled, an outlet for cooled milk communicating with the upper portion of said outer casing, said cooling element comprising outer, intermediate and inner casings forming two concentric, annular spaces for cooling fluid communicating with each other at their lower ends, an inlet for cooling fluid communicating with the upper end of said outer, annular passage and an outlet for cooling fluid communicating with the upper end of said inner, annular passage.

6. In a milk cooler, outer and inner cylindical casings spaced apart, a cooling element located in the space between said inner and outer casing members and projecting above the same, means for maintaining said cooling element in spaced relation to said inner and outer casing members to form attenuated, annular passages for milk to be cooled, a head on said inner casing member forming the bottom of a central, open reservoir for milk to be cooled, the sides of said reservoir being formed by said cooling element, an outlet for cooled milk communicating with the upper portion of said outer casing, said cooling element comprising outer and inner casing walls and an intermediate baffle forming two concentric, annular spaces for cooling fluid communicating with each other at their lower ends, an inlet for cooling fluid communicating with the upper end of said outer, annular passage and an outlet for cooling fluid communicating with the upper end of said inner, annular passage, said cooling element being sealed with the exception of said inlet and outlet and being readily removable from the outer and inner casings to allow access for cleaning to all surfaces contacting with the milk.

7. A milk cooler comprising, a cylindrical outer casing, a flaring upper edge portion secured to said casing, an outlet spout communicating with said flaring portion, a cylindrical inner casing closed at its top and bottom and removably fitting within said outer casing, a cylindrical cooling unit fitting within said outer casing and adapted to surround said inner casing, said cooling unit having cylindrical outer and inner walls slightly spaced from the inner surface of said outer casing and outer surface of said inner casing respectively, the lower end of said cooling unit being spaced from the bottom of said outer casing to permit the passage of milk downward adjacent to said inner casing and then upward adjacent to said outer casing and an annular portion of said cooling unit projecting above said inner casing to provide a central milk reservoir, open at its top, said reservoir communicating with the space between said inner casing and cooling unit.

8. A milk cooler comprising, a cylindrical outer casing closed at its bottom and open at its top, a flaring upper edge portion secured to said casing, an outlet spout communicating with said flaring portion, a cylindrical inner casing closed at its top and bottom and removably fitting within said outer casing, a cylindrical cooling unit removably fitting within said outer casing and adapted to surround said inner casing, said cooling unit having cylindrical outer and inner walls slightly spaced from the inner surface of said outer casing and outer surface of said inner casing respectively, the lower end of said cooling unit being spaced from the bottom of said outer casing to permit the passage of milk to be cooled downward adjacent to said inner casing and then upward adjacent to said outer casing, said cooling unit projecting above said inner casing and being formed with with a central space for milk to be cooled communicating with the space between said inner casing and cooling unit, and annular baffle containing insulating material extending within said cooling unit between its outer and inner walls, an annular inlet for cooling fluid communicating with the outer surface of said baffle and an annular outlet for cooling fluid communicating with the inner surface of said baffle, said baffle being arranged to direct cooling fluid downward adjacent to the outer wall of the cooling unit and upward adjacent to the inner wall thereof.

9. In a milk cooler, outer and inner casings spaced apart, a cooling element located in the space between said inner and outer casing members, a multiplicity of spaced, integral projections on said cooling element for maintaining the same in spaced relation to said outer casing member and forming an attenuated, annular passage for milk, means for supplying milk to be cooled to said passage, an outlet for cooled milk communicating with the upper extremity of said outer casing, said cooling element comprising outer and inner casings and a baffle forming two concentric, annular spaces for cooling fluid communicating with each other at their lower ends and an inlet and an outlet for cooling fluid communicating with the upper portion of said cooling element.

10. In a milk cooler, freely spaced inner and outer casings, an intermediate cylinder for the circulation of a cooling fluid, interposed in spaced relation between said outer and inner casings to form a thin passageway for milk on both peripheries of said cooling element, and inlets and outlets located at the top of the cooler for milk and cooling fluid.

11. In a milk cooler, inner and outer casings, an intermediate cylinder containing peripheral conduits insulated from each other for the circulation of a cooling fluid, said cylinder being slightly spaced from said outer and inner casings, to form thin, connected conduits for milk on both peripheries of said cooling element, and inlets and outlets communicating with the top of the conduits for milk and cooling fluid.

In testimony whereof, I have hereunto signed my name to this specification.

ISAÏE J. B. DEMERS.